(12) United States Patent
Smith et al.

(10) Patent No.: US 6,549,128 B1
(45) Date of Patent: Apr. 15, 2003

(54) METHOD, SYSTEM, AND APPARATUS FOR REMOTELY PROVISIONING NETWORK ELEMENTS TO ELIMINATE FALSE ALARMS

(75) Inventors: Jeffery Alan Smith, Atlanta, GA (US); Vicki Smith Hopson, Mableton, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/966,885

(22) Filed: Sep. 28, 2001

(51) Int. Cl.[7] .............................................. G08B 29/00
(52) U.S. Cl. .................. 340/506; 340/286.01; 340/517; 340/521; 340/3.1; 340/825.36; 340/825.49
(58) Field of Search ............................ 340/506, 286.01, 340/517, 521, 524, 525, 3.1, 825.36, 825.49, 511, 531, 533

(56) References Cited

U.S. PATENT DOCUMENTS 5,400,246 A * 3/1995 Wilson et al. ....... 340/825.06 X
6,369,695 B1 * 4/2002 Horon ................ 340/286.01

* cited by examiner

Primary Examiner—Daryl Pope
(74) Attorney, Agent, or Firm—Merchant & Gould

(57) ABSTRACT

A method, system, and apparatus for remotely provisioning a network element to eliminate a false alarm is provided. A request is received to provision a network element to eliminate a false alarm generated by the network element. In response to the request, a communications connection is established with the network element. Commands are transmitted to the network element instructing the network element to provision one or more features to an "in service" state. The identified features correspond to features supported by the network element for which a false alarm should be reset. The network element is then queried for the identities of one or more active alarms present in the network element following the provisioning of features to an "in service" state. For each alarm present in the network element following provisioning the features to an "in service" state, the features corresponding to each active alarm are provisioned to an "out of service" state.

19 Claims, 9 Drawing Sheets

METHOD, SYSTEM, AND APPARATUS FOR REMOTELY PROVISIONING NETWORK ELEMENTS TO ELIMINATE FALSE ALARMS

TECHNICAL FIELD

The present invention generally relates to the field of network data communications. More specifically, the present invention relates to a method, system, and apparatus for remotely resetting false alarms generated by data network equipment.

BACKGROUND OF THE INVENTION

Recent advances and improvements in communications technology provide the communications industry with an enormous number of opportunities to improve existing services and to branch into new service areas. For instance, thousands of miles of fiber optic cable have been deployed in optical networks. These optical networks make possible the transmission of large amounts of information at great speeds and are used to carry voice signals, data, and video.

The management and monitoring of a large optical network, or other types of large networks, can be difficult and expensive. In order to oversee the operation of large networks from a central location, network reliability centers are utilized. Network reliability centers monitor the operation of a network and alert technicians when a problem occurs. For instance, if network equipment, also called network elements, become inoperative for some reason, an operator at the network reliability center would be notified. A technician may then be dispatched to repair the inoperative equipment.

One of the most expensive and time consuming problems that occurs at network reliability centers is the large number of false alarms that are received from network equipment. One of the major sources of such false alarms is network equipment that has been configured, or provisioned for environmental alarms, but which is not properly connected to the appropriate environmental sensors. For instance, some types of network equipment can detect the presence of fire or water and, if fire or water is detected, generate a network alarm. In order for the equipment to correctly generate such alarms, the equipment must be configured to indicate that the fire and water environmental sensors are installed. Additionally, the environmental sensors must be properly connected to the appropriate port on the device. If the equipment is provisioned to indicate that the environmental sensors are installed, but in fact the sensors are not installed, a false alarm will be generated by the equipment and transmitted to the network reliability center.

One way to eliminate the false alarms generated by such network equipment is to send a field service technician out to the physical location of the equipment. The technician can then manually provision the network device correctly for the installed environmental sensors or other features. However, in networks that have a large number of network locations that are geographically distant, sending technicians out to each network site can be time consuming and costly. The time, energy, and money spent troubleshooting false alarms could be utilized to diagnose and troubleshoot real network problems.

Accordingly, in light of the above, there is a need for a method, system, and apparatus for eliminating falsely generated alarms in network elements that can remotely provision network elements to eliminate false alarms without sending a service technician to the physical location of the elements. Moreover, there is a need for a method, system, and apparatus for eliminating false alarms in network elements that can quickly provision a large number of geographically distant network elements to eliminate falsely generated alarms.

SUMMARY OF THE INVENTION

The present invention meets the above-described needs by providing a method, system, and apparatus for remotely provisioning network elements that can remotely eliminate false alarms without requiring a service technician to be sent to the physical location of the network element. Moreover, the present invention meets the above-described needs by providing a method, system, and apparatus for provisioning network elements that can quickly provision a large number of geographically distant network elements to eliminate falsely generated alarms.

Generally described, the present invention provides a method for remotely provisioning a network element to eliminate a false alarm generated by the network element because of improperly provisioned features. According to one actual embodiment of the present invention, a request is received to reset a false alarm generated by a network element. This request is typically initiated at a network reliability center ("NRC") or other type of network operations center. In response to the request, a communications connection is established with the network element. Commands are then transmitted to the network element instructing the network element to provision one or more features supported by the network element to an "in service", or active, state. The identified features correspond to features supported by the network element for which a false alarm should be reset.

Once the features have been provisioned to an "in-service" state, the network element is queried for the identities of one or more active alarms present in the network element following the provisioning of features to an "in service" state. For each alarm present in the network element following provisioning the features to an "in service" state, the features corresponding to each active alarm are provisioned to an "out of service", or inactive, state. In this manner, only features that are actually installed or connected to the network element are provisioned to an "in service" state. Features that are not installed or that are not correctly connected to the network element are provisioned to an "out of service" state. Following provisioning, no false alarms will be generated by the network element because of improperly provisioned features.

According to one actual embodiment of the present invention, the identity of all active alarms in the network element are retrieved from the network element prior to performing any provisioning. The identities of all active alarms are then saved in a network element status database. In this manner, a "snapshot" is taken of the network element prior to making any configuration changes. A description of all system components contained within the network element may also be retrieved prior to performing any provisioning. This data may also be stored in a network element status database.

The present invention also provides a system for remotely provisioning a network element to eliminate a falsely generated alarm. The system provided according to an embodiment of the present invention comprises a network element supporting one or more features and operative to generate an alarm corresponding to each one of the features that are not correctly installed. The system also comprises a synchronous optical network ("SONET") transport center that is capable of remotely connecting to the network element and issuing commands to the network element.

In one actual embodiment of the present invention, the SONET transport center connects to a network element for which one or more false alarms should be reset. The SONET transport center then issues commands to the network element instructing the network element to provision features for which an alarm should be reset to an "in service", or active, state. Following the provisioning of the features to an "in service" state, the SONET transport center queries the network element for the identities of all active alarms in the network element. For each alarm still active following provisioning features to an "in service" state, the SONET transport center instructs the network element to provision the corresponding feature to an inactive, or "out of service" state. In this manner, the SONET transport center may reset all active alarms within the network element and correctly provision the network element so that additional false alarms will not be generated.

The present invention also provides a computer-controlled apparatus and a computer-readable medium for remotely provisioning a network element to eliminate a falsely generated alarm. Additional aspects of the present invention will be apparent from the detailed description that follows.

DETAILED DESCRIPTION OF AN ILLUSTRATIVE EMBODIMENT

As described briefly above, the present invention provides a method, system, apparatus, and computer-readable medium for remotely provisioning network elements to eliminate false alarms. As mentioned above, one embodiment of the present invention operates within a SONET network. As known to those skilled in the art, SONET is a standardized method for signal conversion between electrical and optical systems. SONET handles a wide range of communications speeds and may be either switched or non-switched.

Figure 1:
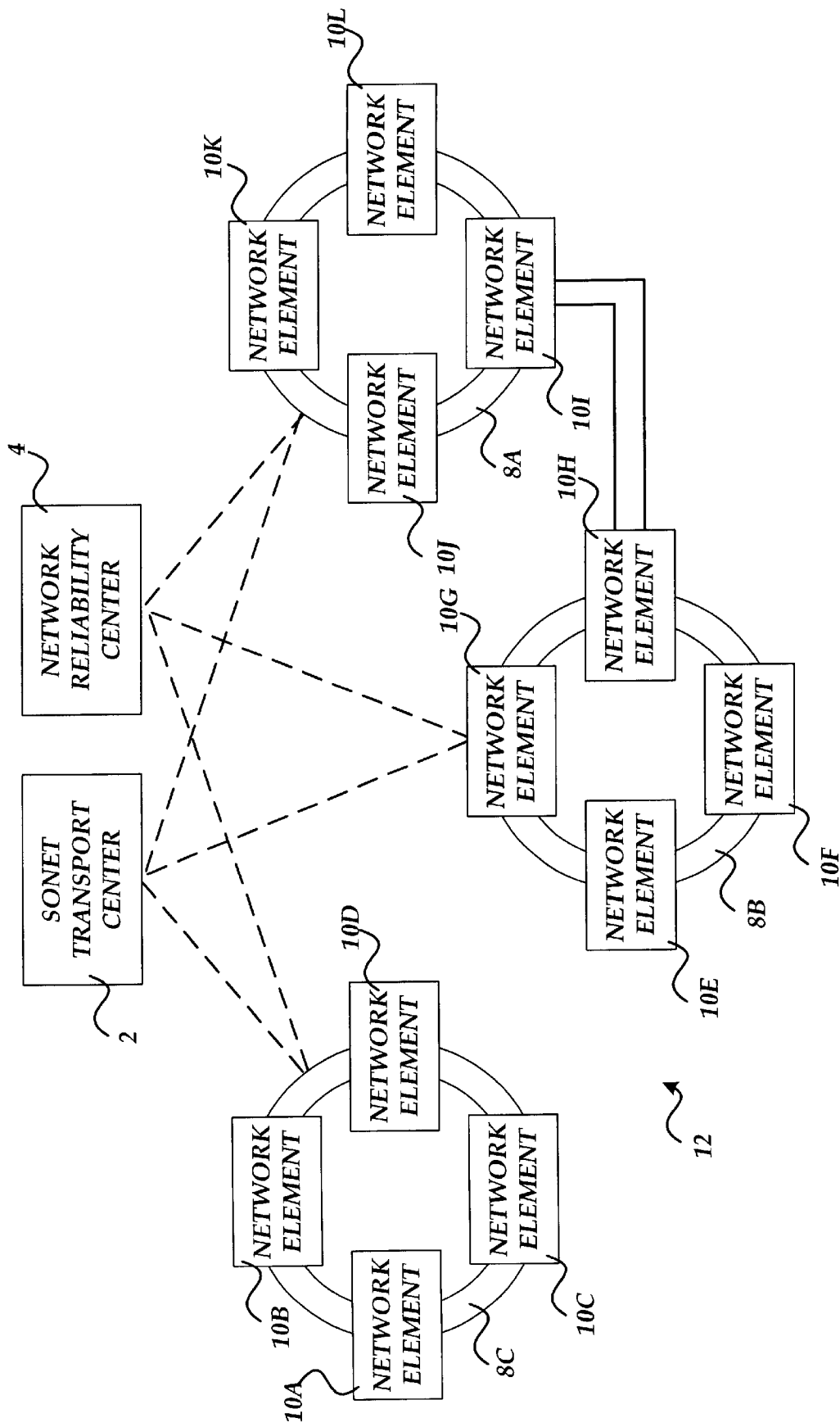
FIG. 1 is a block diagram showing a network of computer systems that comprises an illustrative operating environment for aspects of the present invention.

Turning now to FIG. 1, an illustrative operating environment for the present invention will be described. The operating environment shown in FIG. 1 includes an optical network 12 having one or more SONET rings 8A–8C. An optical network is broadly defined as an information transport facility with fiber optic cables ("optical fibers" or "fibers") serving as the physical link or medium for information transport. Generally, an optical network is a synchronous digital network that conforms to certain standards that define a set of optical interfaces (STS-Nc signals) for network transport. SONET defines standard optical signals (STS-Nc signals), a synchronous frame structure for multiplexed digital information traffic, and operation procedures so that optical networks from different manufacturers/carriers may be interconnected.

As shown in FIG. 1, each SONET ring includes network elements 10A–10L (also called SONET hubs or nodes) that are linked by fiber optic connections to form a closed loop or a ring. For instance, the SONET ring 8A includes linked network elements 10I, 10J, 10K, and 10L. The network elements 10A–10L may also be used to couple SONET rings to one another. For instance, network element 10I and network element 10H are utilized to couple SONET ring 8A to SONET ring 8B. It should be appreciated by those skilled in the art that SONET networks may also be built in a linear fashion or using a combination ring-linear architecture. It should also be appreciated that while aspects of the present invention are practiced in conjunction with a SONET network, the present inventions may be similarly utilized with other types of networks.

In the actual embodiment of the present invention described herein, the network elements 10A–10L comprise FLM 2400 add/drop multiplexor from the Fujitsu Corporation. It should be appreciated, however, that the network elements 10A–10L may comprise add-drop multiplexors from other manufacturers or other types of network elements such as a digital cross-connect system ("DCS"). Additional details regarding the Fujitsu FLM 2400 add/drop multiplexor utilized in the actual embodiment of the present invention described herein will be provided below with reference to FIG. 3.

Each of the network elements 10A–10L in the optical network 12 is communicatively coupled to a SONET transport center 2 and an NRC 4. The NRC 4 provides a single point of contact and accountability for control and analysis of network element alarms or trouble indicators within the optical network 12. The NRC 4 proactively monitors and responds to trouble conditions anywhere in the optical network 12, including all switches and facilities. The network elements 10A–10L, therefore, transmit alarms or other types of trouble indicators to the NRC. 4. The NRC 4 may then respond to these alarms by sending out service technicians or performing other types of tasks. In the actual embodiment of the present invention described herein, alarms generated by network elements that appear to be false may be referred to the SONET transport center 2.

The SONET transport center 2 is a computing facility that is coupled to each of the network elements 10A–10L in the optical network 12. The SONET transport center 2 provides functionality for provisioning the network elements 10A–10L. Provisioning may also be performed at the NRC 4 or other network location. In order to provide such functionality, computer systems utilized at the SONET transport center 2 utilize a communications protocol to communicate with the network elements 10A–10L. The communications protocol is utilized to issue commands to the network elements 10A–10L, to request data from the network elements 10A–10L, and to otherwise communicate with the network elements 10A–10L.

In the actual embodiment of the present invention described herein, the protocol utilized for communication between the SONET transport center 2 and the network elements 10A–10L is transaction language one ("TL1"). As known to those skilled in the art, TL1 is a network element management language defined by Telcordia (formerly Bellcore) that is used in telecommunications equipment. TL1 is a cross-vendor, cross-technology machine-machine language and is the primary protocol used in managing SONET networks. TL1 includes standard messages for fault, configuration, performance, security, and testing. While TL1 is utilized to provide a management interface between the SONET transport center 2 and the network elements 10A–10L in the actual embodiment described herein, other types of management protocols may also be utilized.

Figure 2:
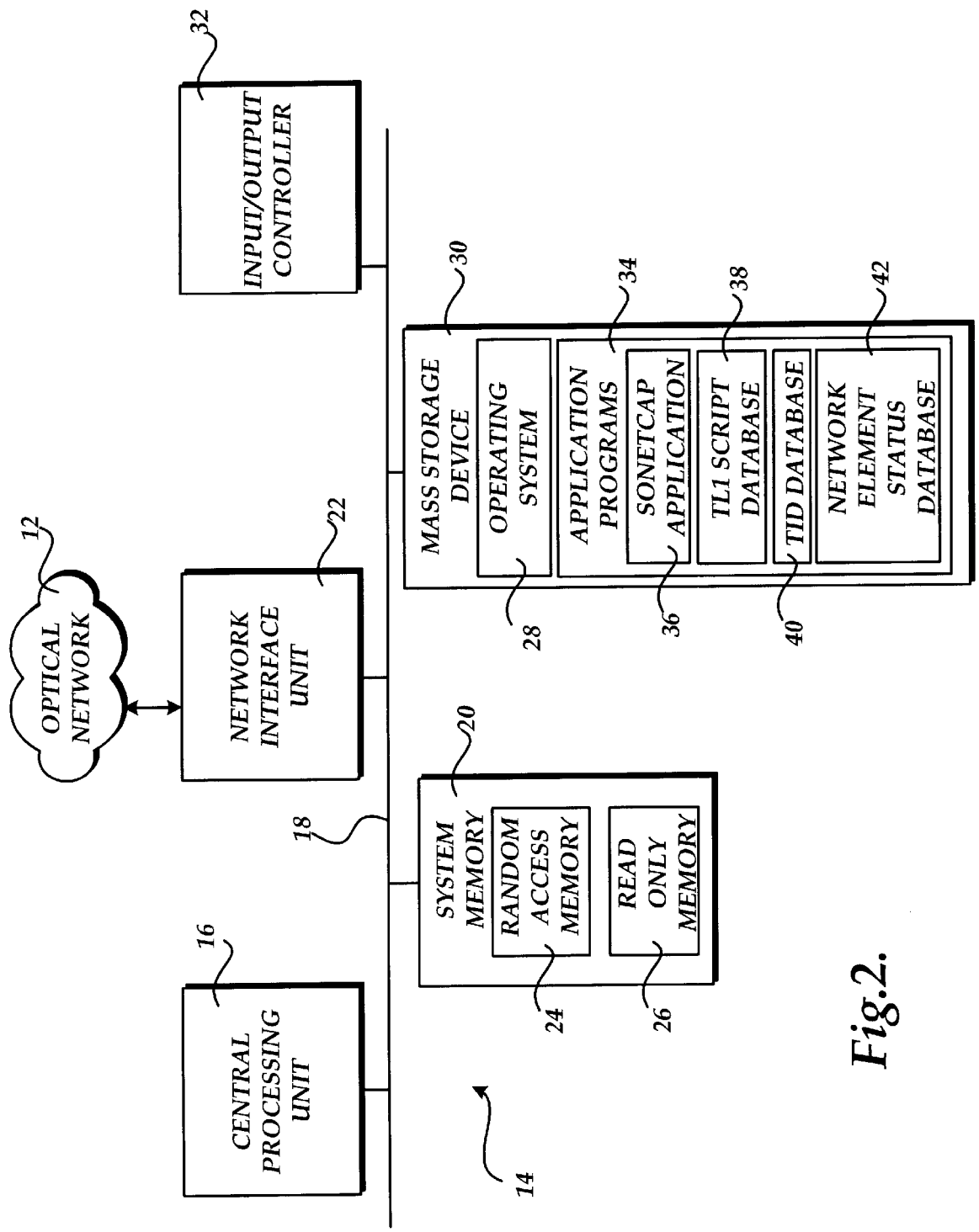
FIG. 2 is a block diagram illustrating a computer architecture for a computer system utilized at a SONET transport center to remotely provision network equipment in an illustrative embodiment of the present invention.
Figure 3:
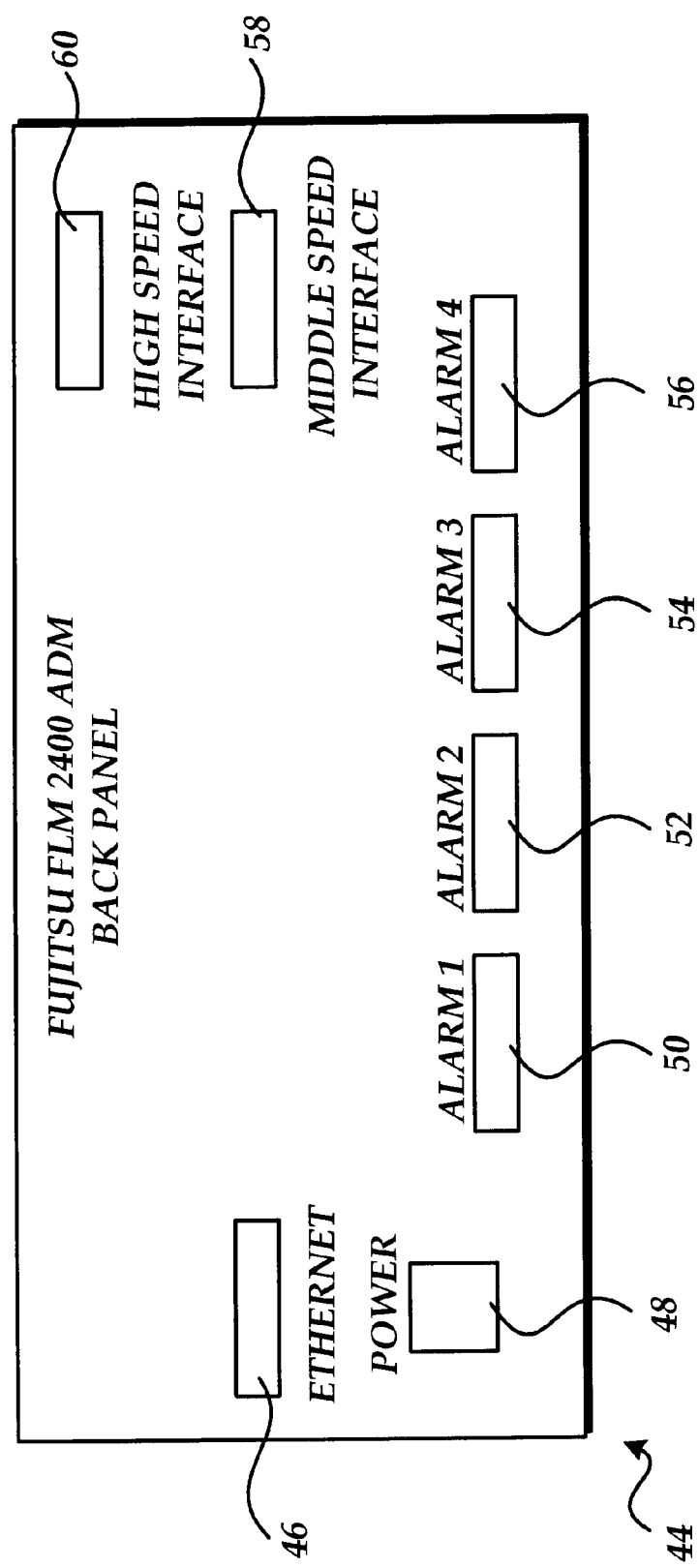
FIG. 3 is a block diagram showing a back panel of an add/drop multiplexer utilized in an actual embodiment of the present invention.

Turning now to FIG. 2, an illustrative computer architecture for a management computer system 14 will be described. The management computer system 14 is located at the SONET transport center 2 and is utilized to communicate with and provision the network elements 10A–10L. The management computer system 15 provisions the network elements 10A–10L to eliminate false alarms as described in detail below. The computer architecture shown in FIG. 3 illustrates a conventional network-capable computer system, including a central processing unit 16 ("CPU"), a system memory 20, including a random access memory 24 ("RAM") and a read-only memory ("ROM") 26, and a system bus 18 that couples the memory to the CPU 16. A basic input/output system ("BIOS") containing the basic routines that help to transfer information between elements within the computer, such as during startup, is stored in the ROM 26. The management computer system 14 further includes a mass storage device 30 for storing an operating system 28 and application programs 34.

The mass storage device 30 is connected to the CPU 16 through a mass storage controller (not shown) connected to the bus 18. The mass storage device 30 and its associated computer-readable media provide non-volatile storage for the management computer system 14. Although the description of computer-readable media contained herein refers to a mass storage device, such as a hard disk or CD-ROM drive, it should be appreciated by those skilled in the art that computer-readable media can be any available media that can be accessed by the management computer system 14.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

As described briefly above, the management computer system 14 communicates with the network elements 10A–10L to issue commands, received data, and perform other tasks. The management computer system 10 connects to the network elements 10A–10L or other devices on the optical network 12 through a network interface unit 22 connected to the bus 18. The management computer system 14 may also include an input/output controller 32 for receiving and processing input from a number of devices, including a keyboard or mouse. Similarly, the input/output controller 32 may provide output to a display screen, a printer, or other type of output device.

A number of program modules may be stored in the mass storage device 30 and RAM 24 of the management computer system 14, including an operating system 28 suitable for controlling the operation of a networked computer system, such as the UNIX operating system, the SOLARIS operating system from SUN MICROSYSTEMS, or the WINDOWS 2000 operating system from MICROSOFT CORPORATION of Redmond, Wash. The mass storage device 30 and RAM 24 may also store one or more application programs 34. In particular, the mass storage device 30 and RAM 24 may store a SONETCAP application 36, a TL1 script database 38, a TID database 40, and a network element status database 42. The SONETCAP application program 36 contains the actual code for communicating with the network elements 10A–10L and performing the method described below with respect to FIGS. 4–9. The TL1 script database 38 contains customized TL1 scripts corresponding to each type of network element on the optical network 12. Custom scripts are utilized for each type of network element to account for peculiarities in implementations of the TL1 protocol. The TID database 40 contains the target identification code ("TID") for each network element 10A–10L on the optical network 12. As will be described in detail below, the TID is used to identify the target network element for a TL1 command. The network element status database 42 is utilized to store configuration and alarm information for network elements before and after provisioning takes place. In this manner, a complete record of the configuration of a network element can be created.

Referring now to FIG. 3, aspects of the Fujitsu FLM 2400 add/drop multiplexor 44 will be described. As discussed briefly above, the Fujitsu FLM 2400 add/drop multiplexor 44 is the network element utilized in the actual embodiment of the present invention described herein. However, the present invention may be similarly used to reset false alarms generated by other types of network elements.

The Fujitsu FLM 2400 add/drop multiplexor 44 is an OC-48 add/drop multiplexor that includes a high-speed and a middle speed interface. The Fujitsu FLM 2400 add/drop multiplexor 44 responds to TL1 protocol commands over X.25, OSI/X.25, OSI/LCN, or IP/LCN. A representation of the back panel of a Fujitsu FLM 2400 is shown in FIG. 3. As shown in FIG. 3, the back panel of the Fujitsu FLM 2400 includes connectors for a high speed interface 60 and a middle speed interface 58. The high speed interface 60 and the middle speed interface 58 connect the Fujitsu FLM 2400 add/drop multiplexor 44 to the optical network 12. The Fujitsu FLM 2400 also includes an Ethernet connector 46 for communicating with an Ethernet network and a power connector 48.

The Fujitsu FLM 2400 add/drop multiplexor 44 also includes several alarm connections 50, 52, 54, and 56. Alarm connections 50, 52, 54, and 56 are utilized for, among other things, generating alarms in response to signals received from environmental sensors. For instance, a water sensor may be connected to one of the alarm connections 50. If water is detected, the water sensor will transmit a signal to the alarm connection 50 to which it is connected indicating that water has been detected.

The Fujitsu FLM 2400 add/drop multiplexor 44 will then transmit an alarm to the NRC 4. The Fujitsu FLM 2400 add/drop multiplexor 44 will generate false alarms to the NRC 4 if the unit is internally configured for environmental sensors that are not physically connected to the unit. For instance, if the unit is configured internally for a water sensor to be attached to the alarm connection 50 and such a sensor is not attached, an alarm will be generated by the unit and transmitted to the NRC 4. The process described herein provisions the unit to ensure that such false alarms will not be generated. The back panel illustrated in FIG. 3 is not meant to illustrate a complete back panel of a Fujitsu FLM 2400. Rather, FIG. 3 is meant to illustrate several of the key connections present on the Fujitsu FLM 2400.

Figure 4:
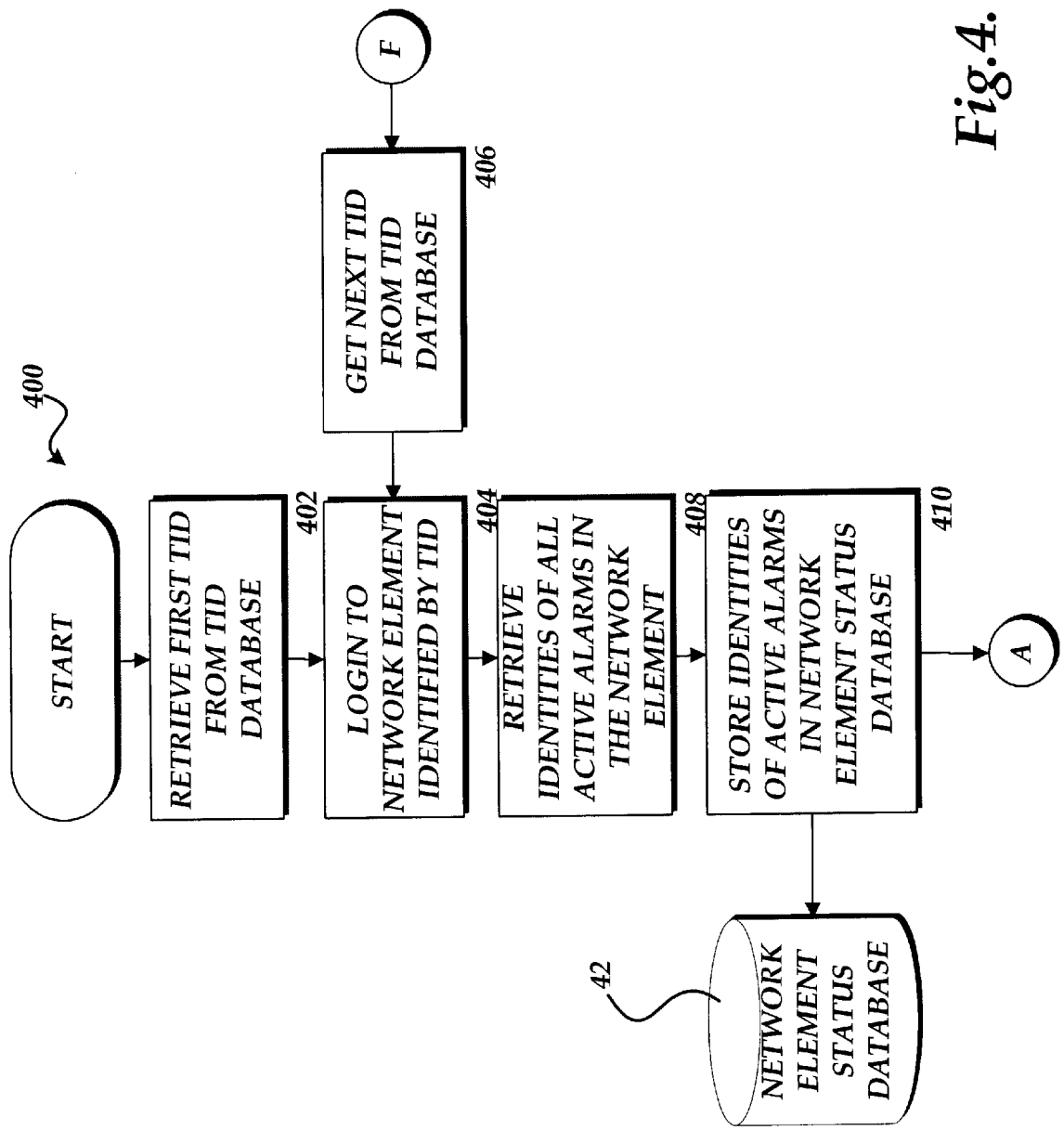
FIGS. 4–9 are flow diagrams showing an illustrative routine for remotely provisioning network equipment to eliminate false alarms according to one actual embodiment of the present invention.
Figure 5:
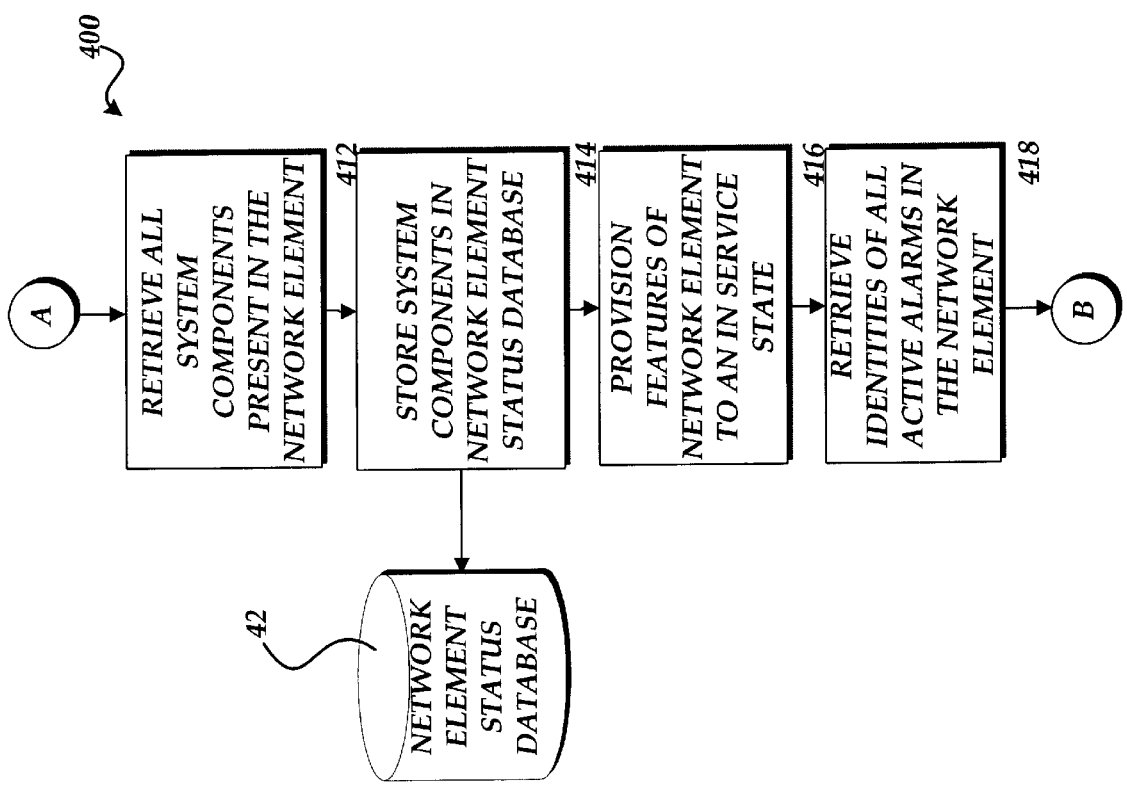
Figure 6:
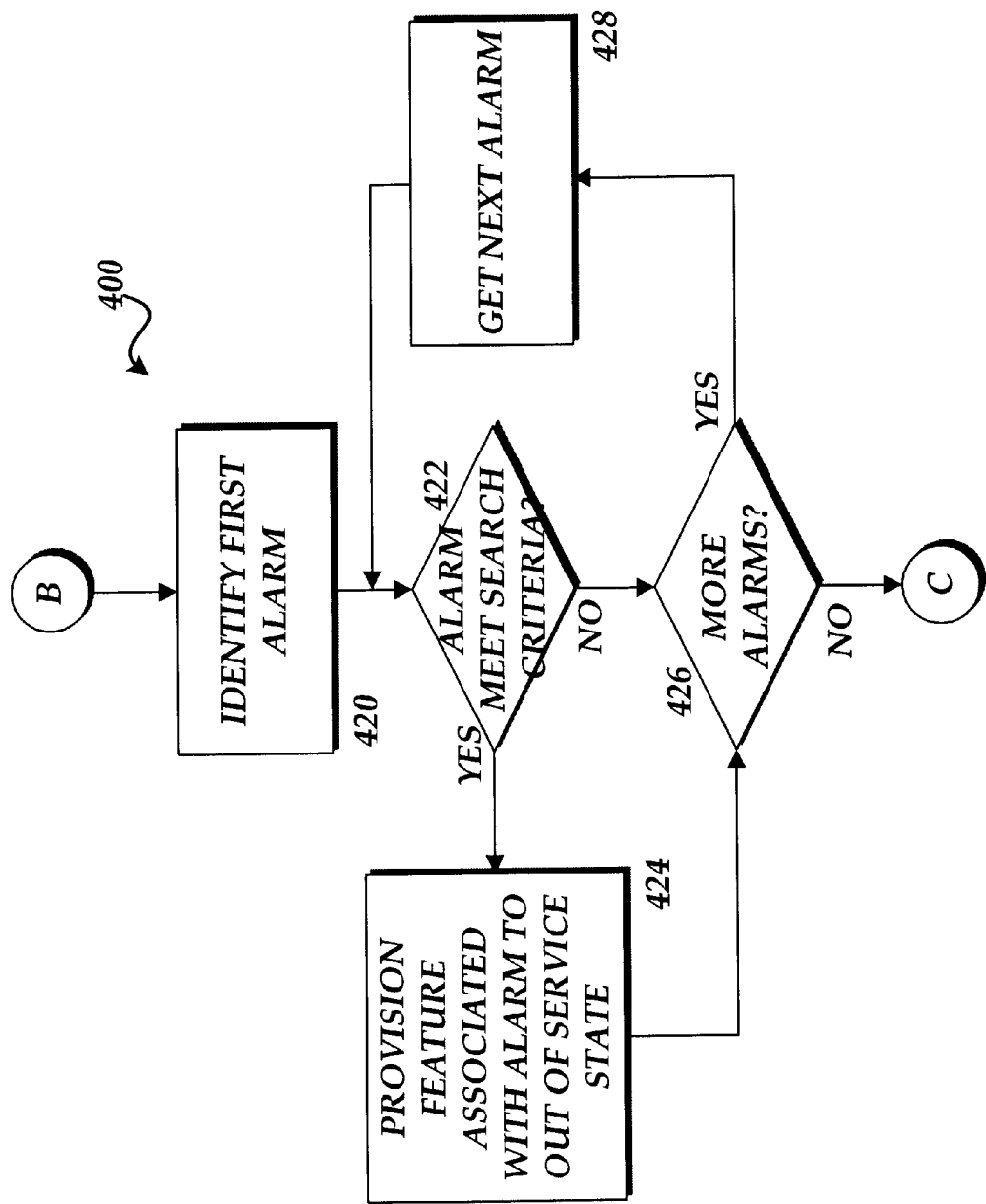
Figure 7:
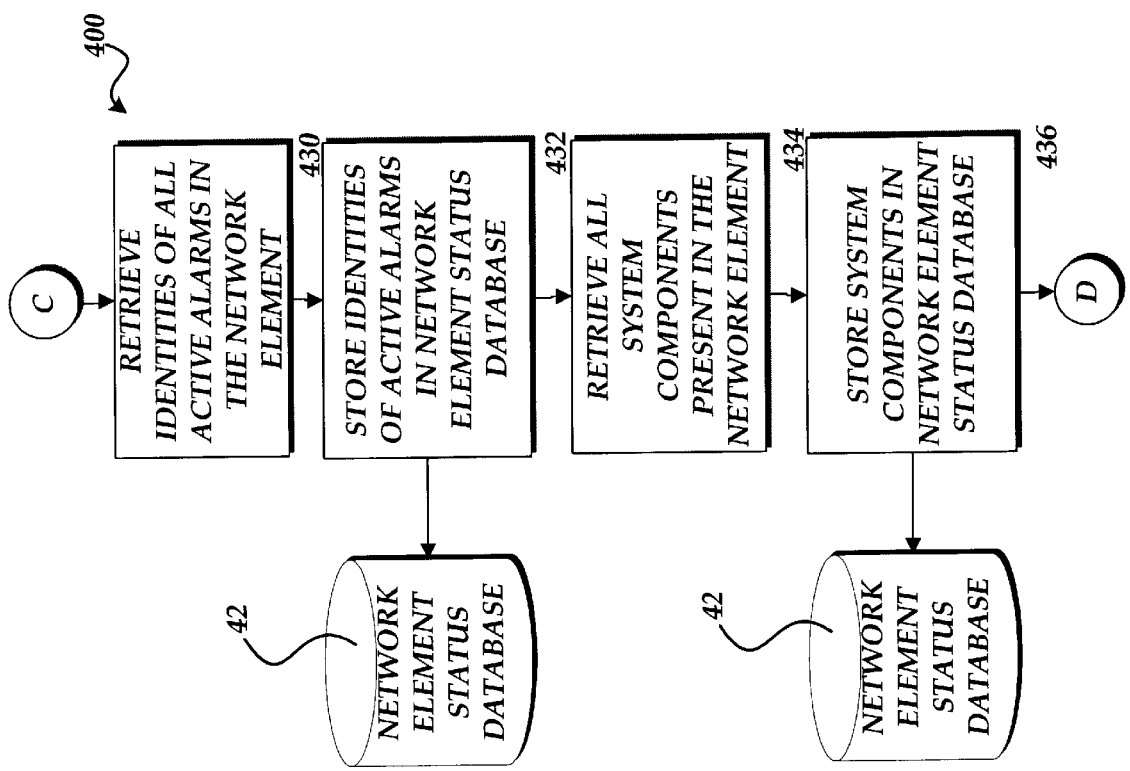
Figure 8:
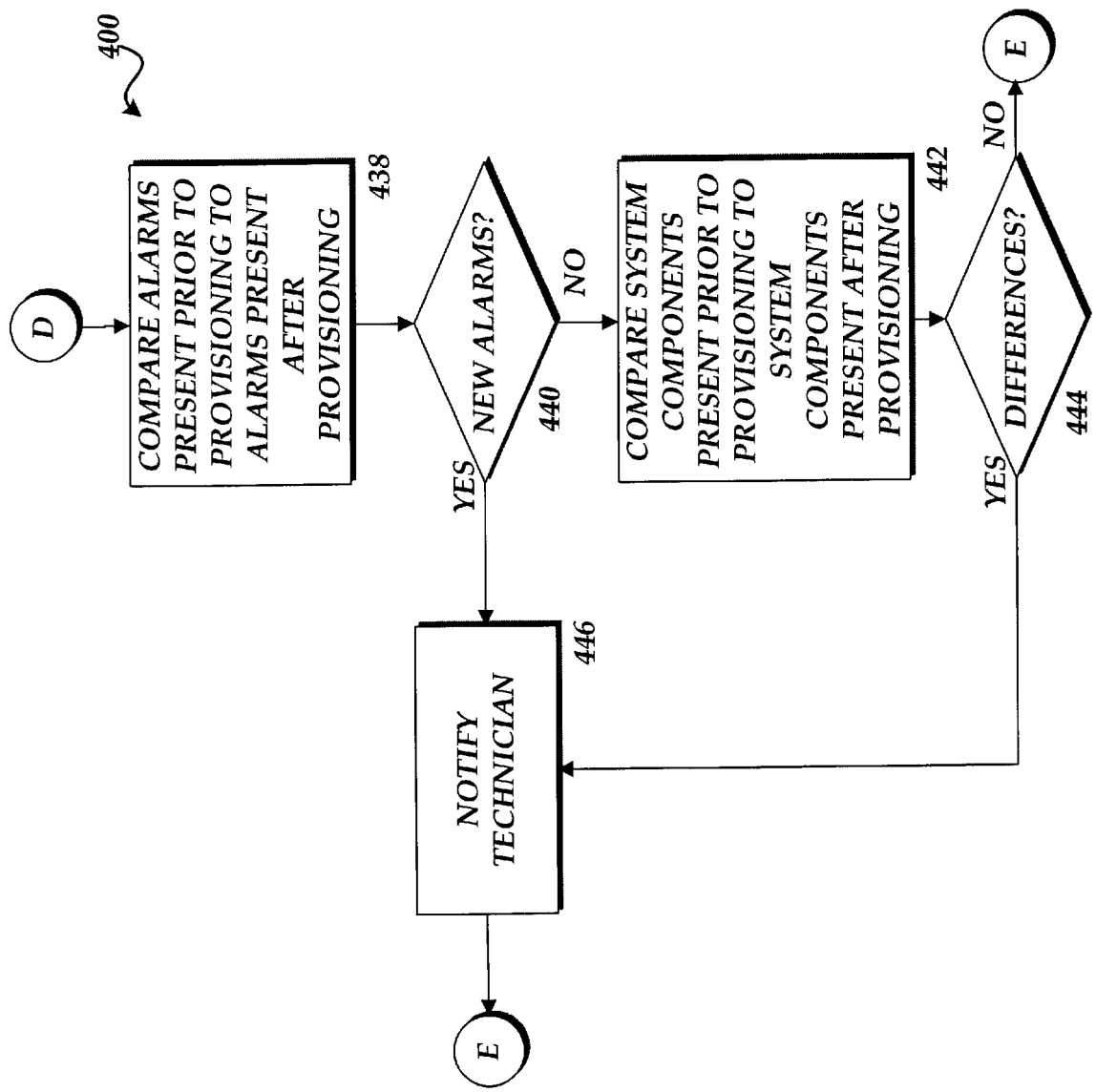
Figure 9:
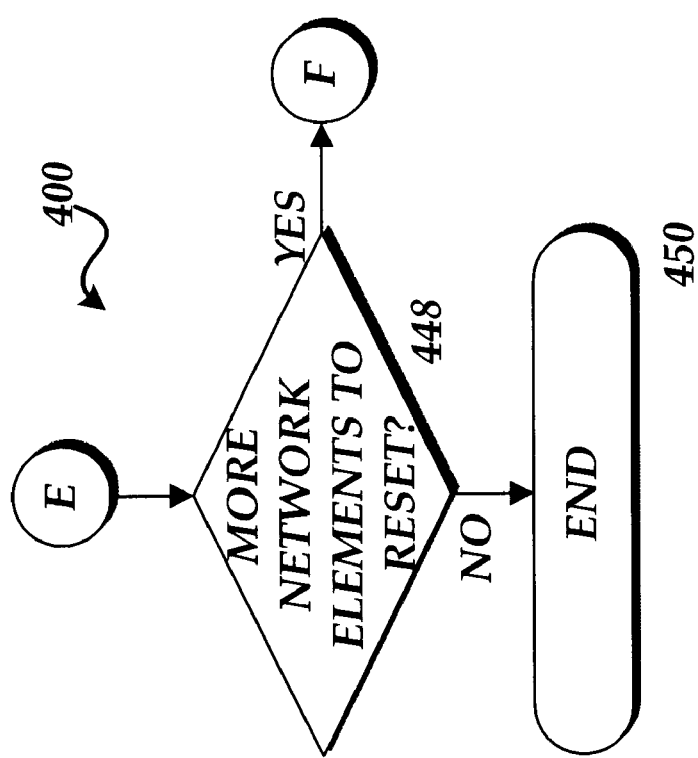

Referring now to FIG. 4, the routine 400 will be described for remotely provisioning one or more network elements to eliminate false alarms. As described above, the routine 400 is executed in response to receiving a request to reset an alarm generated by one or more network elements. The routine 400 begins at block 402 where a first TID is retrieved from the TID database. As discussed above with respect to FIG. 4, the TID database contains the identities of the network elements that should be provisioned to reset false alarms. Once the first TID has been retrieved from the TID database, the routine 400 continues from block 402 to block 404.

At block 404, TL1 commands are transmitted from the SONET transport center 2 to the network element identified by the current TID. These TL1 commands authorize the SONET transport center 2 to access the contents of the network element and to make changes to the configuration of the network element. Once the SONET transport center 2 has been authorized to access and make changes to the network element, the routine 400 continues to block 408.

At block 408, TL1 commands are transmitted from the SONET transport center 2 to the network element identified by the current TID to retrieve the identities of all active alarms in the network element. In response to these commands, the network element will transmit one or more messages identifying each active alarm in the network element. At block 410, the identities of all active alarms in the network element are stored in the network element status database 42. In this manner, all active alarms in the network element prior to making any changes to the configuration of the network element may be identified at a later time. The routine 400 then continues from block 410 to block 412.

At block 412, TL1 commands are issued from the SONET transport center 2 to the network element identified by the current TID for retrieving a description of all system components present in the network element. In response to this command, the network element will transmit a description of all system components present to the SONET transport center 2. At block 414, the identities of all current system components are stored in the network element status database 42. In this manner, a snapshot is taken of the current configuration of the network element prior to making any changes to the configuration.

From block 414, the routine 400 continues to block 416 where one or more features supported by the network element for which an alarm should be reset are provisioned to an in service state. In order to provision these features to an in service state, one or more TL1 commands may be transmitted from the SONET transport center 2 to the network element identified by the current TID.

Once a feature supported by the network element for which an alarm should be reset to an "in service" state have been provisioned, the routine 400 continues to block 418. At block 418, the identities of all currently active alarms in the network element are retrieved. At block 420, the first of any active alarms is identified. The routine 400 then continues to block 422 where a determination is made as to whether the current alarm meets certain search criteria. In the actual embodiment of the present invention described herein, the search criteria identify alarms corresponding to environment sensors. If the alarm does not match the search criteria corresponding to the environment sensors, then the features associated with the alarm will not be provisioned to an "in service" state. This prevents the present invention from improperly provisioning features on a network element for which alarms should not be reset. Other types of search criteria may be utilized to provision and reset other types of alarms known to those skilled in the art.

If, at block 422, it is determined that the current alarm meets the search criteria, the routine 400 branches to block 424. At block 424, the feature associated with the alarm is provisioned to an "out of service" state. By provisioning the feature to an "out of service" state, the alarm associated with the feature will no longer be generated. The routine 400 then continues from block 424 to block 426 where a determination is made as to whether there are additional alarms to be reset. If additional alarms exist, the routine 400 branches to block 428 where the next alarm is retrieved. If, at block 426, it is determined that no additional alarms remain to be reset, the routine 400 continues to block 430.

At block 430, the identities of all active alarms in the network element identified by the current TID are retrieved. The routine 400 then continues to block 432, where the identities of all active alarms in the network element are stored in the network element status database 42. The routine 400 then continues to block 434 where a description of all system components present in the network element is retrieved from the network element. The routine 400 then continues to block 436, where the description of the system components in the network element are stored in the network element status database 42.

From block 436, the routine 400 continues to block 438 where the identities of alarms present in the network element prior to provisioning are compared to the identities of the alarms present in the network element after provisioning. From block 438, the routine 400 continues to block 440 where a determination is made as to whether new alarms were present in the network element following the provisioning of the alarms within the network element. If new alarms are present within the network element, the routine 400 branches to block 446 where a technician is notified. If no new alarms have been generated in the network, the routine 400 continues from block 440 to Block 442. At block 442, the description of all system components present in the network element prior to provisioning alarms is compared to the description of system components within the network element present after provisioning alarms. From block 442, the routine 400 continues to block 444 where a determination is made as to whether differences exist within the description of system components before and after provisioning alarms. If differences exist, the routine 400 branches from block 444 to block 446, where a technician is notified. If no differences exist, the routine 400 branches to block 448 where a determination is made as to whether additional network elements remain within the TID database for which alarms should be reset. If additional network elements remain within the TID database for which alarms should be reset, the routine 448 branches to block 406, where the next TID is retrieved from the TID database. The above-described process is then repeated for the next network element. If, at block 448, it is determined that no additional network elements remain for which alarms should be reset, the routine 400 continues to block 450, where it ends.

Based upon the foregoing, it should be appreciated that the present invention provides a method, apparatus, system, and computer-readable medium for remotely provisioning network elements to eliminate falsely generated alarms. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for remotely provisioning a network element to eliminate an alarm generated by the network element, comprising:
   receiving a request to reset an alarm generated by said network element, said request comprising a network address for said network element and an identity of one or more features supported by said network element for which an alarm should be reset;
   opening a remote communications link with said network element in response to said request;
   retrieving an identity of one or more active alarms in said network element and saving said identity of said active alarms in a network element status database;
   retrieving a description of all system components provisioned in said network element and saving said description of all system components in a network element status database;
   provisioning said features supported by said network element for which an alarm should be reset to an in service state;
   retrieving an identity of one or more active alarms in said network element following said provisioning said features to an in service state; and
   provisioning features associated with each alarm present in said network element following provisioning said features to an in service state, to an out of service state.

2. A method for remotely provisioning a network element to eliminate an alarm generated by the network element, comprising:
   receiving a request to reset an alarm generated by said network element;
   provisioning one or more features supported by said network element for which an alarm should be reset to an in service state;
   retrieving an identity of one or more active alarms in said network element following said provisioning said features to an in service state; and
   provisioning features to an out of service state for each alarm present in said network element following provisioning of said features to an in service state.

3. The method of claim 2, further comprising:
   retrieving an identity of one or more active alarms in said network element prior to provisioning said features to an in service state; and
   saving said identity of said active alarms in a network element status database.

4. The method of claim 3, further comprising:
   retrieving a description of all system components provisioned in said network element prior to provisioning said features to an in service state; and
   saving said description of all system components in a network element status database.

5. The method of claim 2, wherein said request to reset an alarm comprises a network address for said network element and an identity of one or more features supported by said network element for which an alarm should be reset.

6. The method of claim 2, wherein said network element comprises a node on a SONET network.

7. The method of claim 6, wherein said network element comprises an add/drop multiplexer.

8. The method of claim 7, wherein said add/drop multiplexer comprises a Fujitsu FLM 2400 add/drop multiplexer.

9. A system for remotely provisioning a network element to eliminate an alarm generated by the network element, comprising:
   a network element supporting one or more features and operative to generate an alarm corresponding to each of said features that are not correctly installed; and
   a SONET transport center operative to remotely connect to said network element, to provision one or more features supported by said network element for which an alarm should be reset to an in service state, to retrieve an identity of one or more active alarms in said network element following said provisioning said features to an in service state, and to provision features to an out of service state corresponding to each alarm present in said network element following provisioning of said features to an in service state.

10. The system of claim 9, wherein said network element comprises an add/drop multiplexer.

11. The system of claim 10, wherein said add/drop multiplexer comprises a Fujitsu FLM 2400 add/drop multiplexer.

12. The system of claim 9, wherein said SONET transport center is further operative to retrieve an identity of one or more active alarms in said network element prior to provisioning said features to an in service state, and to save said identity of said active alarms in a network element status database.

13. The system of claim 10 wherein said SONET transport center is further operative to retrieve a description of all system components provisioned in said network element prior to provisioning said features to an in service state and to save said description of all system components in a network element status database.

14. A computer-readable medium comprising computer-readable instructions which, when executed by a computer, cause the computer to:
   provision one or more features supported by a network element for which an alarm should be reset to an in service state;
   retrieve an identity of one or more active alarms in said network element following said provisioning said features to an in service state; and to
   provision features to an out of service state for each alarm present in said network element following provisioning of said features to an in service state.

15. The computer-readable medium of claim 14, wherein said computer-readable instructions further cause the computer to:
   retrieve an identity of one or more active alarms in said network element prior to provisioning said features to an in service state; and to
   save said identity of said active alarms in a network element status database.

16. The computer-readable medium of claim 14, wherein said computer-readable instructions further cause the computer to:
   retrieve a description of all system components provisioned in said network element prior to provisioning said features to an in service state; and to
   save said description of all system components in a network element status database.

17. A computer-controlled apparatus capable of:
   provisioning one or more features supported by a network element for which an alarm should be reset to an in service state;

retrieving an identity of one or more active alarms in said network element following provisioning said features to an in service state; and provisioning features to an out of service state for each alarm present in said network element following provisioning of said features to an in service state.

18. The computer-controlled apparatus of claim 17, wherein said computer-controlled apparatus is further operative to:

retrieve an identity of one or more active alarms in said network element prior to provisioning said features to an in service state; and to save said identity of said active alarms in a network element status database.

19. The computer-readable medium of claim 18, wherein said computer-controlled apparatus is further operative to:

retrieve a description of all system components provisioned in said network element prior to provisioning said features to an in service state; and to save said description of all system components in a network element status database.

* * * * *